United States Patent
Smith

(10) Patent No.: US 8,687,531 B2
(45) Date of Patent: Apr. 1, 2014

(54) WIRELESS SYSTEM FOR COMMUNICATION

(75) Inventor: Mark Jeffrey Smith, San Antonio, TX (US)

(73) Assignee: BelAir Networks Inc. (CA)

( * ) Notice: Subject to any disclaimer, the term of this patent is extended or adjusted under 35 U.S.C. 154(b) by 398 days.

(21) Appl. No.: 12/964,194

(22) Filed: Dec. 9, 2010

(65) Prior Publication Data

US 2011/0075646 A1   Mar. 31, 2011

Related U.S. Application Data

(63) Continuation of application No. 12/246,525, filed on Oct. 7, 2008, now abandoned, which is a continuation of application No. 10/760,610, filed on Jan. 20, 2004, now Pat. No. 7,433,361, and a continuation of application No. 10/760,866, filed on Jan. 20, 2004, now Pat. No. 7,433,343.

(60) Provisional application No. 60/471,978, filed on May 20, 2003.

(51) Int. Cl.
 *H04B 7/00* (2006.01)
(52) U.S. Cl.
 USPC ......................................................... 370/310
(58) Field of Classification Search
 USPC ......................................................... 370/310
 See application file for complete search history.

(56) References Cited

U.S. PATENT DOCUMENTS

| | | |
|---|---|---|
| 3,359,460 A | 12/1967 | Ragone et al. |
| 4,837,820 A | 6/1989 | Bellavia, Jr. |
| 5,528,582 A | 6/1996 | Bodeep et al. |
| 5,581,801 A | 12/1996 | Spriester et al. |

(Continued)

FOREIGN PATENT DOCUMENTS

| | | |
|---|---|---|
| EP | 940006 B1 | 8/2001 |
| EP | 1214819 A1 | 6/2002 |

(Continued)

OTHER PUBLICATIONS

Stephen Lee, Power line access reviewed, InfoWorld: Jan. 7, 2002: vol. 24: Issue 1; p. 15.

(Continued)

*Primary Examiner* — Chirag Shah
*Assistant Examiner* — Majid Esmaeilian
(74) *Attorney, Agent, or Firm* — Katten Muchin Rosenman LLP

(57) ABSTRACT

A system for wirelessly communicating from a high speed data modem using a first radio transceiver at a first location and a second radio transceiver at a second location preferably includes: (i) a housing (containing the data modem, the first radio transceiver, a radio processor, and a power supply) connected to an outdoor supporting structure, which supports a coaxial cable carrying an RF signal and AC power; (ii) a splitter to split the RF signal from the AC power, wherein the radio processor sends a digital signal to the first radio transceiver, which sends the signal to a first antenna, and wherein the signal is provided from the first antenna to a second antenna coupled to the second radio transceiver at a user device, wherein the system communicates the signal from the second antenna to the second radio transceiver and then to a second radio processor coupled to the user device; and wherein the DC power is provided to the data modem, the first radio transceiver, and the radio processor.

68 Claims, 5 Drawing Sheets

(56) References Cited

U.S. PATENT DOCUMENTS

| | | |
|---|---|---|
| 5,737,194 A | 4/1998 | Hopkins et al. |
| 5,781,844 A | 7/1998 | Spriester et al. |
| 5,930,113 A | 7/1999 | McCann |
| 6,028,769 A | 2/2000 | Zurek |
| 6,089,881 A | 7/2000 | Daoud |
| 6,192,230 B1 | 2/2001 | van Bokhorst et al. |
| 6,199,207 B1 | 3/2001 | Jelinek et al. |
| 6,259,933 B1 | 7/2001 | Bambridge et al. |
| 6,377,782 B1 | 4/2002 | Bishop et al. |
| 6,411,825 B1 | 6/2002 | Csapo et al. |
| 6,625,222 B1 | 9/2003 | Bertonis et al. |
| 6,628,627 B1 | 9/2003 | Zendle et al. |
| 6,735,450 B1 | 5/2004 | Remmert |
| 6,785,150 B1 | 8/2004 | Szilagi et al. |
| 6,785,513 B1 | 8/2004 | Sivaprakasam |
| 6,788,868 B2 | 9/2004 | McLain et al. |
| 6,811,447 B2 | 11/2004 | Pfister et al. |
| 6,862,353 B2 | 3/2005 | Rabenko et al. |
| 6,870,837 B2 | 3/2005 | Ho et al. |
| 6,885,674 B2 | 4/2005 | Hunt et al. |
| 6,910,148 B1 | 6/2005 | Ho et al. |
| 6,931,659 B1 | 8/2005 | Kinemura |
| 6,957,047 B1 | 10/2005 | Young et al. |
| 6,980,089 B1 | 12/2005 | Kline et al. |
| 7,035,270 B2 | 4/2006 | Moore, Jr. et al. |
| 7,042,897 B1 | 5/2006 | Sivaprakasam et al. |
| 7,126,417 B2 | 10/2006 | Bishop |
| 7,130,625 B2 | 10/2006 | Akgun et al. |
| 7,149,474 B1 | 12/2006 | Mikhak |
| 7,162,234 B1 | 1/2007 | Smith |
| 7,209,771 B2 | 4/2007 | Twitchell, Jr. |
| 7,230,935 B2 | 6/2007 | Proctor, Jr. et al. |
| 7,392,424 B2 | 6/2008 | Ho et al. |
| 7,433,343 B1 | 10/2008 | Smith |
| 7,433,361 B1 | 10/2008 | Smith |
| 7,596,798 B2 | 9/2009 | Bertonis et al. |
| 7,598,857 B1 | 10/2009 | Reagan et al. |
| 7,646,355 B2 | 1/2010 | Bishop |
| 7,664,504 B2 | 2/2010 | Bishop |
| 7,669,323 B2 | 3/2010 | Pfister et al. |
| 8,340,064 B2 * | 12/2012 | Smith .......................... 370/338 |
| 2002/0010866 A1 | 1/2002 | McCullough et al. |
| 2002/0061012 A1 | 5/2002 | Thi et al. |
| 2002/0147978 A1 | 10/2002 | Dolgonos et al. |
| 2003/0021080 A1 | 1/2003 | Koperda et al. |
| 2003/0033608 A1 | 2/2003 | Chang et al. |
| 2003/0115610 A1 | 6/2003 | Cho |
| 2003/0185169 A1 | 10/2003 | Higgins |
| 2003/0226017 A1 | 12/2003 | Palekar et al. |
| 2004/0151282 A1 | 8/2004 | Jones, III et al. |
| 2004/0204097 A1 | 10/2004 | Scheinert et al. |
| 2005/0144649 A1 | 6/2005 | Bertonis et al. |
| 2006/0159114 A1 | 7/2006 | Bishop |
| 2006/0217076 A1 | 9/2006 | Bishop |
| 2006/0217138 A1 | 9/2006 | Bishop |
| 2006/0251017 A1 | 11/2006 | Bishop |
| 2006/0252378 A1 | 11/2006 | Bishop |
| 2006/0280176 A1 | 12/2006 | Bishop |
| 2007/0028280 A1 | 2/2007 | Bishop |
| 2007/0155403 A1 | 7/2007 | Bishop |
| 2007/0167171 A1 | 7/2007 | Bishop |
| 2007/0198702 A1 | 8/2007 | Bishop |
| 2007/0213049 A1 | 9/2007 | Bishop |

FOREIGN PATENT DOCUMENTS

| | | |
|---|---|---|
| EP | 1618694 A2 | 1/2006 |
| EP | 1884071 A1 | 2/2008 |
| EP | 1884072 A1 | 2/2008 |
| EP | 1908190 A1 | 4/2008 |
| EP | 1989933 A1 | 11/2008 |
| WO | 9108649 A1 | 6/1991 |
| WO | 9108650 A1 | 6/1991 |
| WO | 9108651 A1 | 6/1991 |
| WO | 9112694 A1 | 8/1991 |
| WO | 9210038 A1 | 6/1992 |
| WO | 9210062 A1 | 6/1992 |
| WO | 9326121 A1 | 12/1993 |
| WO | 9326122 A1 | 12/1993 |
| WO | 9326123 A1 | 12/1993 |
| WO | 9326124 A1 | 12/1993 |
| WO | 9326125 A1 | 12/1993 |
| WO | 9326126 A1 | 12/1993 |
| WO | 9326127 A1 | 12/1993 |
| WO | 9326128 A1 | 12/1993 |
| WO | 9326129 A1 | 12/1993 |
| WO | 9326130 A1 | 12/1993 |
| WO | 9747082 A1 | 12/1997 |
| WO | 9747168 A1 | 12/1997 |
| WO | 0052880 A1 | 9/2000 |
| WO | 0115396 A1 | 3/2001 |
| WO | 0247329 A2 | 6/2002 |
| WO | 02093315 A2 | 11/2002 |
| WO | 0282743 A3 | 3/2003 |
| WO | 0282752 A3 | 2/2004 |
| WO | 2004098117 A2 | 11/2004 |
| WO | 2004114604 A2 | 12/2004 |
| WO | 2005053210 A2 | 6/2005 |
| WO | 2006105060 A1 | 10/2006 |
| WO | 2006119452 A1 | 11/2006 |
| WO | 2006119453 A1 | 11/2006 |
| WO | 2006119454 A1 | 11/2006 |
| WO | 2007011632 A1 | 1/2007 |

OTHER PUBLICATIONS

Peter J. Howe, Cisco, Utility to Launch Start-Up See New Way to Get Offer Net Access, The Boston Globe, Jun. 11, 2001.

Allen Fear, Siemens SpeedStream Powerline 802.11b Wireless Access Point, Cnet.com, <URL: http://reviews.cnet.com/wireless-access-points/siemens-speedstream-powerline-802/4505-3265_7-20684674.html#reviewPage1>, product released on Nov. 7, 2002, Reviewed on Feb. 4, 2003; reiview updated on Jul. 5, 2010.

* cited by examiner

WIRELESS SYSTEM FOR COMMUNICATION

CROSS REFERENCE TO RELATED APPLICATIONS

This application is a continuation of U.S. patent application Ser. No. 12/246,525, filed Oct. 7, 2008, which is: (i) a continuation of U.S. patent application Ser. No. 10/760,610, filed on Jan. 20, 2004 (now U.S. Pat. No. 7,433,361, issued Oct. 7, 2008), and (ii) a continuation of U.S. patent application Ser. No. 10/760,866, filed on Jan. 20, 2004 (now U.S. Pat. No. 7,433,343, issued Oct. 7, 2008), both of which claim priority to U.S. Provisional Patent Application Ser. No. 60/471,978 filed May 20, 2003, all of which are expressly incorporated herein by reference. U.S. Pat. No. 7,162,234 to the same inventor also claims priority to U.S. Provisional Patent Application Ser. No. 60/471,978.

FIELD OF THE INVENTION

Embodiments of the invention relate to a commercial modem/router and a wireless system of data communications. The method and system generally uses two radio transceivers for an inexpensive data and communication device usable without the need for construction or hardwiring.

BACKGROUND

Hybrid fiber coaxial networks (HFC networks) are typically used for delivery of television signals to subscribers. Each subscriber represents either an individual or a business and is connected to the cable TV HFC network through a trunk and branch configuration to individual subscribers.

The HFC network can also carry a connection to the Internet, voice, fax and data. To date, customers in business have had great challenges in connecting to the HFC network. The present invention was designed to meet that need.

A need has long existed to expand the serviceable market to provide Internet, voice, fax, and data connectivity. The present invention addresses the need to a less expensive and faster technique to permit customers to access these services over cable in commercial facilities.

Another need in the business was to have a system that can be used through a window so that no roof rights are required by a client for connecting to the HFC network.

BRIEF DESCRIPTION OF THE DRAWINGS

The detailed description will be better understood in conjunction with the accompanying drawings, wherein like reference characters represent like elements, as follows.

The present embodiments are detailed below with reference to the listed Figures.

DETAILED DESCRIPTION OF THE EMBODIMENTS

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

Figure 1:
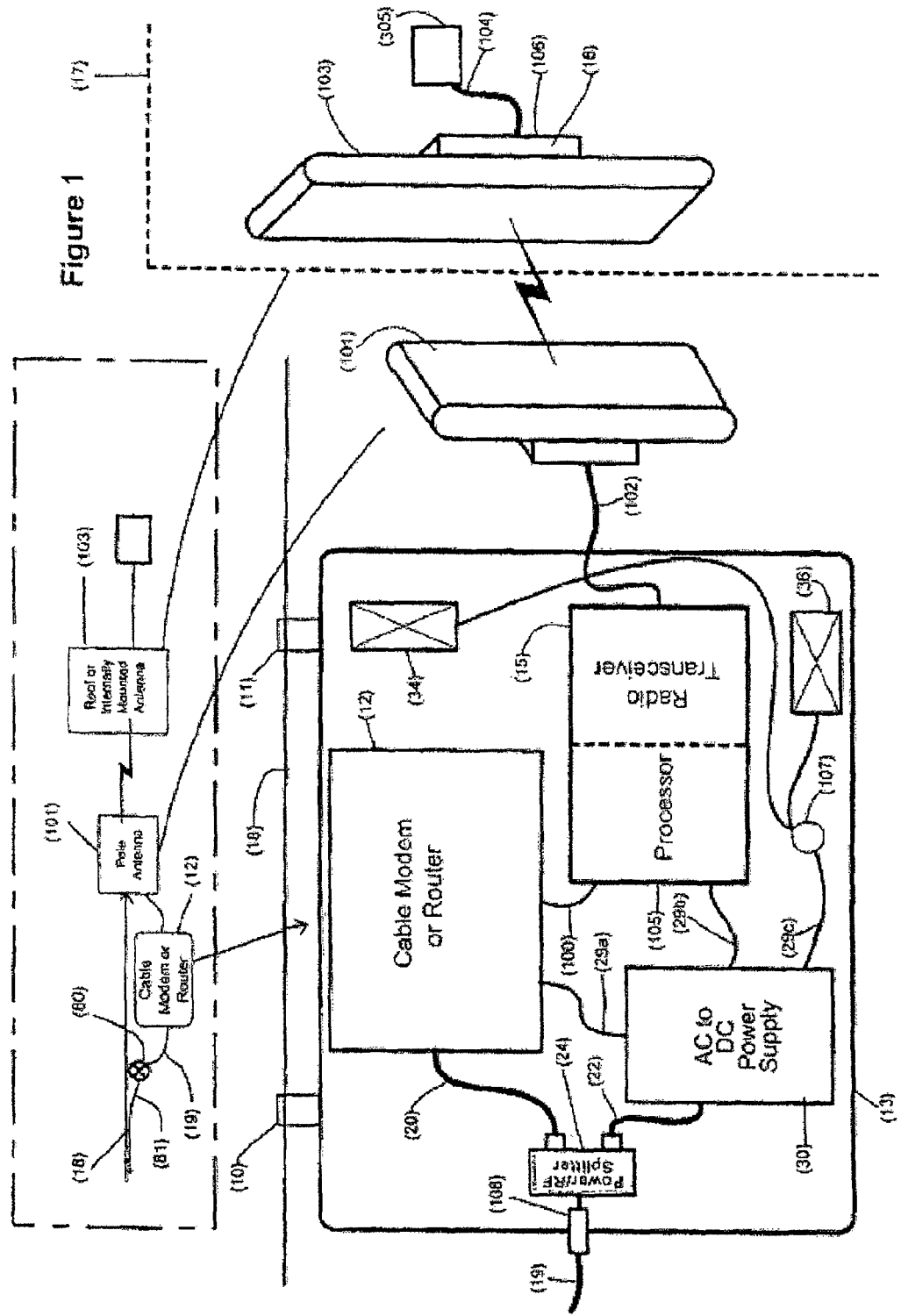
FIG. 1 is a diagram of the equipment usable with the method and system.

FIG. 1 relates to a method and system of wirelessly communicating information from a bidirectional high speed data cable modem/router via a wireless Ethernet connection, which can be a radio transceiver and cable combination to a customer's location.

Wirelessly communicating is preferably radio based communication, but can include infrared, laser based or light based communication. In addition, other electromagnetic frequency communication (microwave) frequency can be used within the scope of this invention.

The method uses a system that is illustrated as a single particular communications channel in FIG. 1. Multiple links and channels of those links, such as communications links of wired and wireless channels, can be used in embodiments of the invention described herein.

The method and system generally includes wirelessly communicating information from a bidirectional high speed data modem/router in a housing via an Ethernet connection on a first radio transceiver communicating with a second radio transceiver at a customer's premises, wherein the housing connects to a supporting strand which supports a coaxial cable carrying a RF spectrum signal and AC power.

In an embodiment, wherein the housing can contain a bidirectional high speed data modem operably connected to a first radio transceiver, a first radio processor card, and a switching power supply, wherein the housing is operably connected to a supporting strand and wherein the supporting strand simultaneously supports a coaxial cable carrying an RF spectrum signal and an AC power signal.

The method and system generally includes splitting the signal with an RF/power splitter from the coaxial cable into the RF spectrum signal and the AC power.

The method and system further includes transmitting the RF spectrum signal from the splitter into the bidirectional high speed data modem/router and generating a digital Ethernet signal from the modem/router to the first radio transceiver.

The method and system can further includes at least one heating and cooling device adapted to heat and cool contents of the housing.

In addition, the method and system can include converting the AC power to a DC power supply using a converter and stepping down the voltage with a switching power supply.

In addition, the method and system can include the first radio processor card that is adapted to send a signal from the first radio transceiver and then to the first antennae and beam the signal from the first antennae to a second antenna.

The method and system also includes communicating the signal from the second antennae to a second radio transceiver and then to a second radio processor card to a client device.

Further, the method and system includes using the power from the switching power supply (to run the modem/router and the radio transceiver, as well as a plurality of heating and cooling devices, wherein the plurality of heating and cooling devices are adapted to heat or cool the contents of the housing.

The method and system also includes communicating the signal from the first radio transceiver to a first antenna, beaming the signal from the first antenna to a second antenna and communicating the signal from the second antenna to a second radio transceiver to a client device.

The method and system also includes communicating the signal from the first radio transceiver to a first antenna, beaming the signal from the first antenna to a second antenna and communicating the signal from the second antenna to a plurality of electronic devices comprising radio transceivers.

A wireless communication device for communicating information from a bidirectional high speed data cable modem via an Ethernet connection using a first radio transceiver at a first location and communicating with a second radio transceiver at a customer's premises can be used with the present method and system.

The wireless communication device can comprise a housing containing a bidirectional high speed data modem operably connected to a first radio transceiver, a first radio processor card, and a switching power supply. The device can further have a splitter adapted to engage the coaxial cable and split the RF spectrum signal from the AC power. The device can also have at least one heating and cooling device adapted to heat and cool contents of the housing.

Returning to FIG. 1, a cable modem/router (12), such as a DOCSIS cable modem/router, is disposed in a housing (13). The cable modem/router and housing are connected to a supporting strand (18), such as with a first mounting bracket (10) and a second mounting bracket (11). The supporting strand supports a fiber/coaxial cable (19). The housing is preferably water or weather resistant housing, such as one made from molded plastic, metal, a composite, a weatherproof water tight coated laminate or combinations thereof. The housing is large enough to hold the cable modem/router, at least one heating and/or cooling device, one or more radio transceivers, a power supply converter, thermostat (107), and associated cables. The housing can also include a lightning protector.

Figure 2:
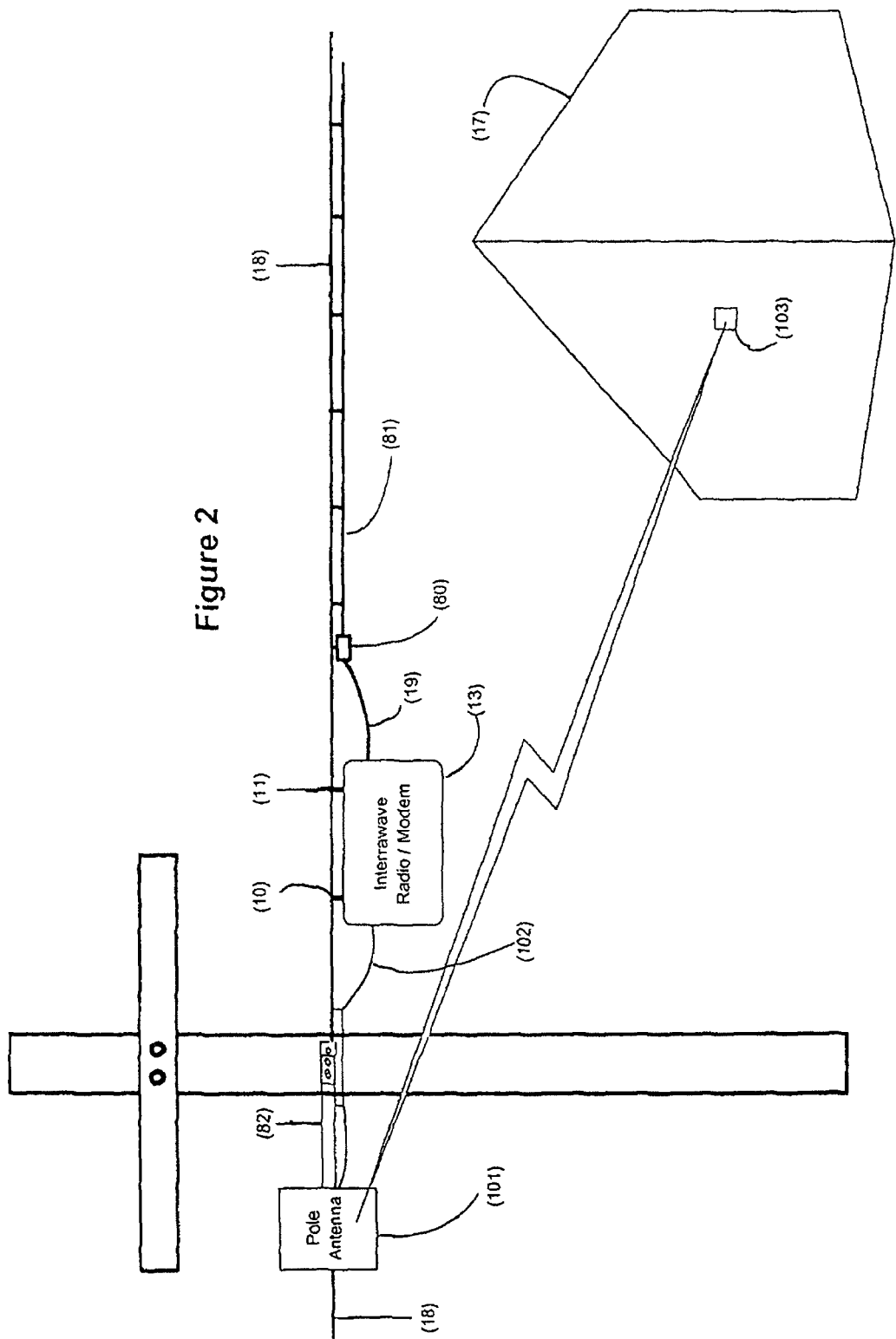
FIG. 2 depicts a detailed view of the strand with accompanying coaxial cable used in the method and system of FIG. 1.

The supporting strand (18) described in the invention is shown in detail in FIG. 2, wherein the strand supports the fiber/coaxial cable (19) which contains an RF spectrum signal (20), which is preferably a CATV signal, but can also be other types of signals. The RF spectrum signal can have digital content, such as digital music, and also return information, such as compressed video libraries. The coaxial cable (19) also provides a source of AC power (22) which is typically between approximately 50 volts up to and slightly exceeding 100 volts. In one embodiment, the supporting strand (18) and the fiber/coaxial cable (19) are sealed inside a material, such as rubber.

Returning now to FIG. 1, which shows a splitter (24), which can receive the input from the fiber/coaxial cable (19) and splits the input into an RF spectrum signal (20) and the AC power (22). Preferably the splitters accept a combined AC/RF signal fed into a single input, such as an F connector, and separates the combined AC/RF into two separate outputs, one being RF and the other being the AC power, each with their own connectors.

The RF spectrum signal is communicated to a bidirectional high speed data cable modem/router (12) which is can be a DOCSIS cable modem/router, such as a model PCX 100 manufactured by Toshiba of Tokyo Japan, or can be a similar data over cable system interface specification (DOCSIS) modem/router, such as those available from Cisco of Sunnyvale Calif. or Motorola of Arizona.

The cable modem/router (12) communicates with a first processor PCB (105) which can accommodate either one or two radio transceivers (15) over a cable (100) in an embodiment. The radio transceiver can be any wireless device or 802.11X wireless device, such as an Orinoco Wireless networks radio transceiver or a Dell model 1150 True Mobile 11 Mbps Wireless LAN adapter or another compatible 802.11X receiver as known to one skilled in the art.

The first processor PCB (105), power supply (30), radio transceiver (15) and the cable modem/router (12) can be temperature regulated using first heating and/or cooling device (34) and optionally a second heating and/or cooling device (36). The first radio transceiver, cable modem/router, and heating and cooling devices in the housing (13) can all be powered from an AC to DC power supply (30) that can provide a plurality of DC power supplies (29a, 29b, 29c, 29d, and 2e) to each of these units.

The power results from the AC power being split from the coaxial cable then can be transmitted to a switching power supply such as a switching power supply from Integrated Power Design, which can convert and regulate the AC to DC power. The outputs are between about 0.1 volts to about 48 volts of DC current. One or more outputs of the switching power supply can have this voltage. In the embodiments, the outputs are between about 9 volts to about 12 volts each. The first processor card (105) can communicate with a radio transceiver (15).

The first radio transceiver (15) can further communicate with a first antenna (10 1) via an RF cable (102). Antennas manufactured by Arc Wireless of Denver, Colo. can be used in the invention, but additional antennas can also be used.

The first antenna (101) can wirelessly communicates with a second antenna (103) at a client's premise (17). The second antenna can communicate with a second radio transceiver (16) that can further communicate to a second processor card (106) that can further communicate to a client device (305) via an Ethernet cable (104).

In an embodiment, the first antenna can be fastened to a pole mounting bracket (82) that in turn can be further fastened to a utility pole for stability. The second antenna either can be roof mounted or mounted behind a non-metallic wall or window for communicating with the first antenna.

Figure 3:
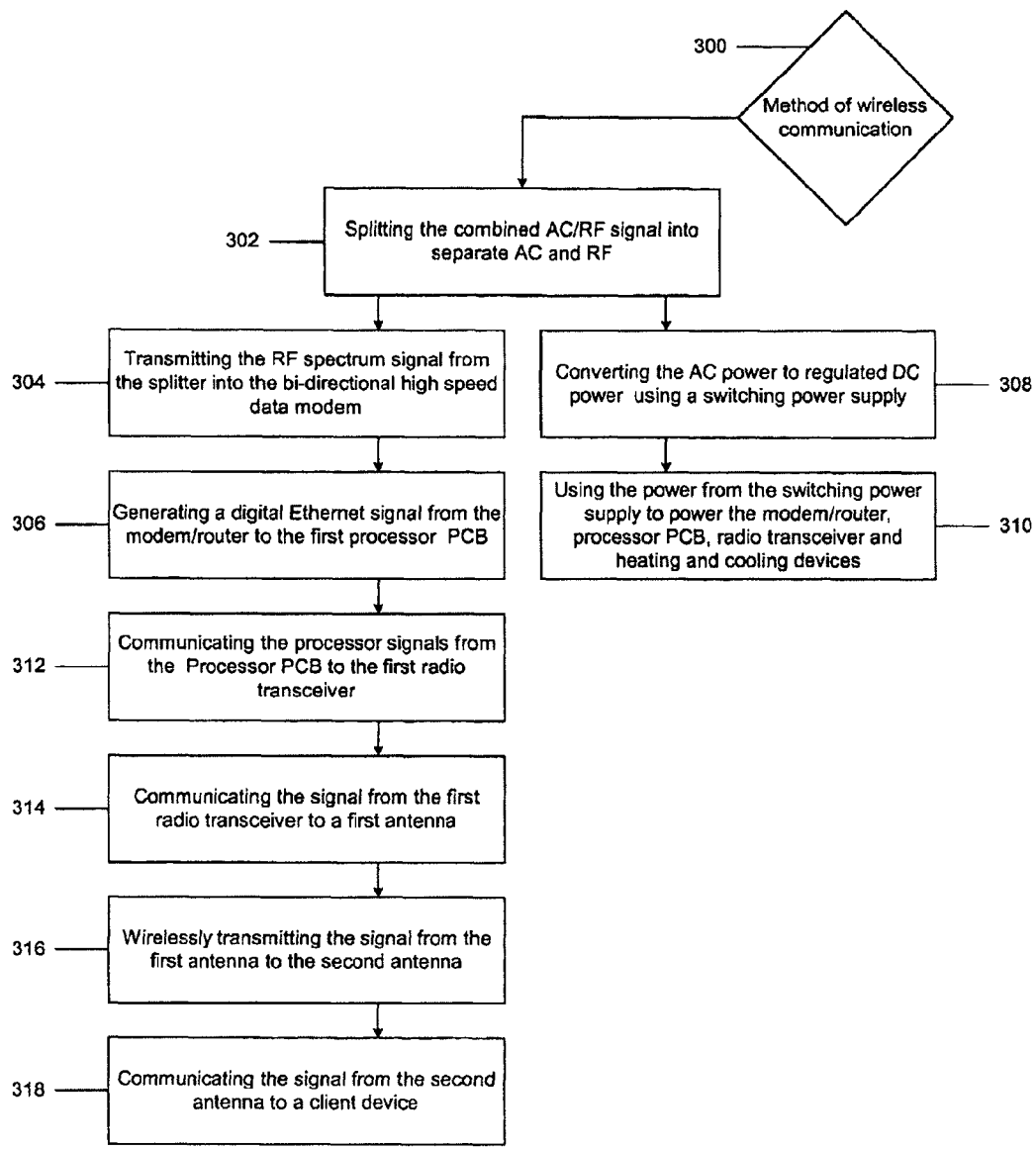
FIG. 3 is a schematic diagram of the steps used in the method.

FIG. 3 depicts an embodiment of the method.

The method (300) can generally includes wirelessly communicating information from a bidirectional high speed data cable modem/router in a housing via an Ethernet connection on a first radio transceiver communicating with a second radio transceiver at a customer's premises, wherein the housing connects to a supporting strand that supports a coaxial cable carrying a RF spectrum signal and AC power.

The method can generally includes splitting (302) the signal with an RF/power splitter from the coaxial cable into the RF spectrum signal and the AC power.

The method can further include transmitting (304) the RF spectrum signal from the splitter into the bidirectional high speed data cable modem/router and generating a digital Ethernet signal (306) from the modem/router to the first processor card and the first radio transceiver.

In addition, the method can include converting (308) the AC power to DC power using a converter and stepping down the voltage with a switching power supply. The switching power can then be used to supply power to the modem/router, processor and the radio transceiver, as well as a plurality of heating and cooling devices (310). The heating and cooling devices can be adapted to heat or cool the contents of the housing.

Continuing with FIG. 3, the processor signals are communicated from the processor PCB to the first radio transceiver (312). The method continues by communicating the signal (314) from the first radio transceiver to a first antenna, transmitting (316) the signal from the first antenna to a second antenna and communicating the signal (318) from the second antenna to a second radio transceiver then to a client device.

In an embodiment, the cable modem/router can perform half duplex communications. However, full duplex communications can also be appropriate depending upon a specific application.

Figure 4:
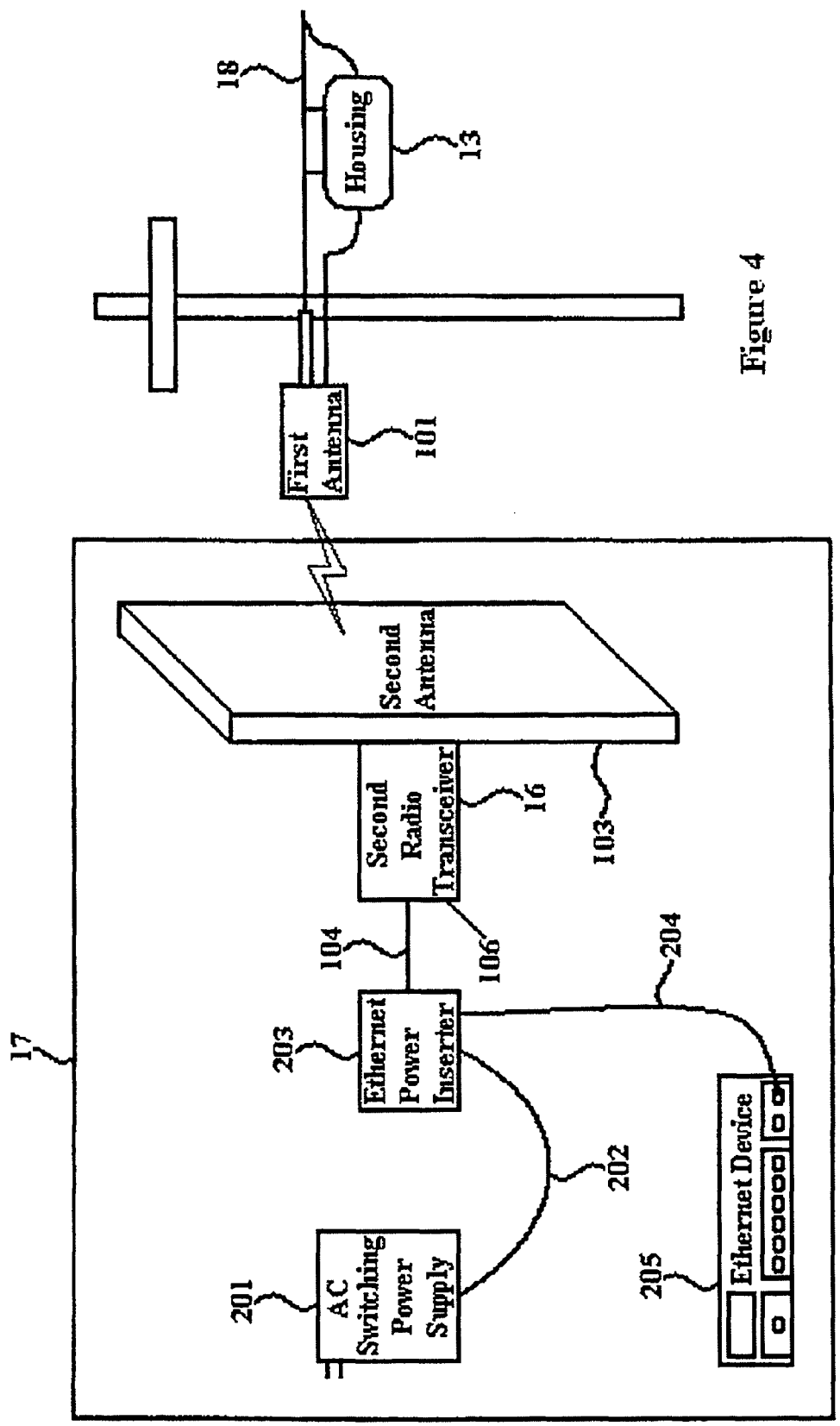
FIG. 4 depicts a view of the customer's site showing the equipment used in the method and system.

FIG. 4 shows the customer's premises using the equipment usable in the method and system of the invention. FIG. 4 shows that a signal from the first antenna (101) can be transmitted into a customer's premises (17). The signal can be received by the second antenna (103), which connects to the second radio transceiver (16). The 5 second transceiver (16) connects to a second radio processor card (106). The card (106) then transmits an Ethernet signal carried by a cable (104), which can be a Ethernet cable that communicates via a cable (204), to the customer's LAN or computer or other Ethernet device.

Power to operate the radio processor card (106) and the antenna (103) can be provided by a power over Ethernet system that includes an AC switching power supply (20 I) connected to a power cord (202), which is connected to an Ethernet power inserter (203), which delivers power across the Ethernet cable (104) to the processor card affiliated with the antenna (103). An antenna communicates with the second processor card and carries the bidirectional signal to the client's device (205) that can attach to a hub, switch, router or other Ethernet connection.

In one embodiment, the cable modem/router (12) communicates with a Wide Area network ("WAN") connection (20). In another embodiment, the processor card (16) communicates with a client device (205) such as a PC or Local Area network ("LAN") connection.

In one embodiment, the bidirectional high speed data modem/router is a data over cable system interface specification (OOCSIS) modem/router. The DOCSIS modem/router can have a functionality consisting of automatic registration, encryption, and automatic assignment of IP addresses.

In one embodiment, the client device can be a computer, a local area network (LAN), a network hub, a remote terminal unit for monitoring remote equipment, a digital camera, a fax, a phone, an Ethernet switch, a router, and combinations thereof.

The computer can be any micro processing device that includes processing and memory functions, such as a personal digital assistant, a notebook computer, a processor-equipped cellular phone or any other similar device.

The computer can further include a co-processor module, which includes a digital signal processor (DSP) to enhance processing capabilities and capacity of the computer. The DSP of the co-processor module can serve a variety of functions and operations, such as, supplying added encryption/decryption, communications, protocol handling and location capabilities, e.g., global positioning system calculations, for example. The co-processor module is particularly suited for enabling and enhancing operations of the computer according to the protocols and ASP services systems and methods described herein.

In one embodiment, the method and system can further include a housing to encase the splitter, first radio transceiver, converter, switching power supply and communication links. The housing can be formed of a material such as molded plastic, a metal, a composite material, weatherproof sealed coated laminate or combinations thereof.

In another embodiment, the method and system can further include a second transceiver disposed in the housing in parallel communication with the bidirectional high speed data modem/router. For example, the modem/router can be connected to the strand independent of connection to a utility pole.

In one embodiment, the housing can further include a detector for detecting a first location of the client device. For example, the detector is a computer. The invention is capable of the bi-directional transmission of such information that may be one or more signals such as data, phone, fax, video, audio, USB, Internet, multimedia or any combination thereof.

Figure 5:
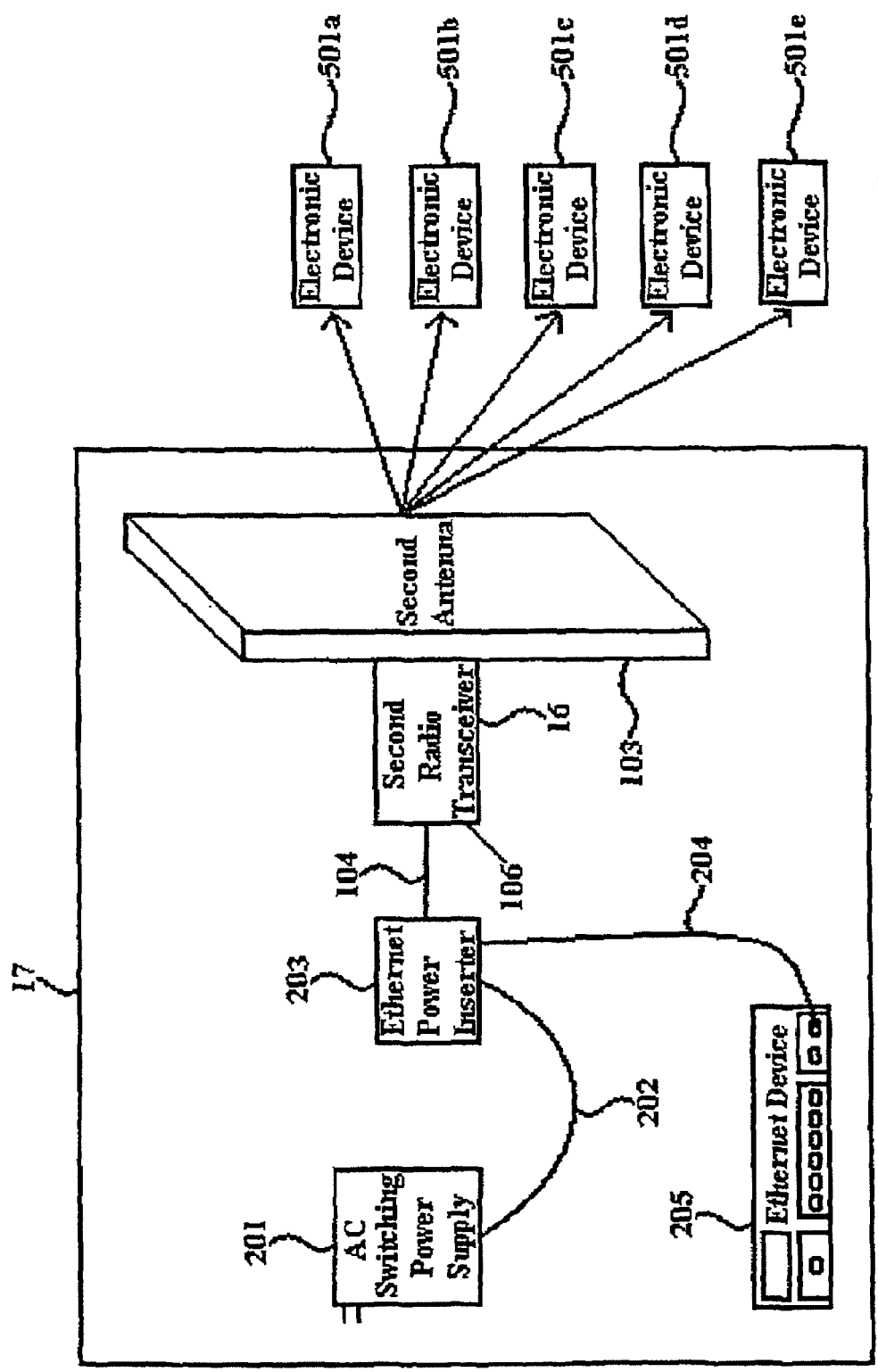
FIG. 5 is a diagram of the equipment used in an embodiment of the method and system.

FIG. 5 depicts the embodiment of the a method and system of wirelessly communicating information from a bidirectional high speed data cable modem via an Ethernet connection that uses a first radio transceiver at a first location and it communicates to a plurality of electronic devices. Each electronic device can include radio transceivers. The method and system can entail beaming the signal from the first antenna to at least one of a plurality of electronic devices (501a, 501b, 501c, 501d, and 501e).

Examples of electronic devices (501a, 501b, 501c, 501d, and 501e) can be laptops, PCs computers, personal digital assistants (PDA), personal electronic devices communicating with satellites, cell phones, GPS location devices, or other mobile electronic devices that can interface to networks. The radio transceiver card installed in the electronic devices can be card rated IEEE 802.11b or 802.11g card or a similar type card.

The method and system creates a public access area known as a "hot spot" from the housing. The housing can contain modems and other equipment to connect to the electronic devices for public high speed internet access. The method and system can additionally include authentication techniques to enable access by a user using a defined protocol, such as a set of email addresses.

The method and system can also be adapted to comprise a technique, such as management techniques, billing techniques, accounting techniques, reporting techniques, and combinations thereof. These techniques can enable additional reports on at least one of the electronic devices.

The method and system can also include the unique features including a. capable of incorporating any cable modem/router into the device that meets the enclosures size and power requirements;

b. capable of providing point-to-point and or point-to-multipoint transmission of secure non 802.11X signal using inexpensive 802.11X hardware;

c. usable as a standard 802.11X access point allowing users to access high speed internet and/or local area networks wirelessly;

d. usable as a 802.11X "Hot Spot" device with the ability to communicate with a AAA appliances or any other 802.11X wireless device and allow clients high speed internet access through various means of authentication such as, but not limited to a user's email address or credit card information;

e. ability to change operation of the device to any of the above through changes in software switches; and f. usable as a unique pole mounting bracket that allows for a stable mounting of the antenna that in most cities does not require a permit because no contact with the utility pole itself is made.

The method and system can use a wireless communication system. The system communicates the information using a first radio transceiver at a first location and sends the information to a second radio transceiver at a customer's premises.

The system can include a housing containing a bidirectional high speed data modem/router operably connected to a first radio transceiver, a first radio processor card, and a switching power supply. The housing can be operably connected to a supporting cable strand. The supporting cable strand can simultaneously support a coaxial cable carrying an RF spectrum signal and an AC power signal. The system can have at least one heating and cooling device to heat and cool contents of the housing.

The system can also include a splitter adapted to engage the coaxial cable and split the RF spectrum signal from the AC power.

The first radio processor card can be adapted to send a signal from the first radio transceiver, send the same signal to the first antenna, and then beam the signal from the first antenna to a second antenna.

The system can also adapted to communicate the signal from the second antenna to a second radio transceiver and then to a second radio processor card and then to a client device.

The method can use of a device that can include a housing with a bidirectional high speed data modem/router operably connected to a first radio transceiver, a first radio processor card, and a switching power supply. The splitter can be adapted to engage the coaxial cable and split the RF spectrum signal from the AC power. The device can include at least one heating and cooling device adapted to heat and cool contents of the housing.

While these embodiments have been described with emphasis on the preferred embodiments, it should be understood that within the scope of the appended claims, these embodiments might be practiced other than as specifically described herein.

What is claimed is:

1. A wireless communication system for communicating information from a bidirectional high speed data modem via a data connection using a first radio transceiver at a first location and a second radio transceiver at a second location, comprising:

a housing containing (i) the bidirectional high speed data modem operably connected to the first radio transceiver, (ii) a first processor, and (iii) a power supply, wherein the housing comprises a mounting bracket connected to a cable strand, such that a top of the housing is disposed vertically below a location at which the cable strand supports a shielded two-conductor coaxial cable which carries an RF signal and AC power; and a splitter engaging the coaxial cable to split the RF signal from the AC power, wherein the power supply converts the AC power to DC power;

wherein the first processor receives a signal from the bidirectional high speed data modem and sends a corresponding signal to the first radio transceiver which sends a corresponding wireless to a first antenna, and wherein the wireless signal is transmitted from the first antenna to a second antenna coupled to a mobile user device; and wherein the system communicates the signal from the second antenna to the second radio transceiver and then to a second processor, both contained in the mobile user device.

2. The system of claim 1, wherein the bidirectional high speed data modem communicates with a Wide Area network ("WAN") connection.

3. The system of claim 1, wherein the bidirectional high speed data modem communicates with a wireless Local Area network ("LAN") connection.

4. The system of claim 1, wherein the bidirectional high speed data modem comprises a data over cable system interface specifications (DOCSIS)-compliant modem.

5. The system of claim 4, wherein the DOCSIS-compliant modem has a functionality comprising automatic registration, encryption, and automatic assignment of IP addresses.

6. The system of claim 1, wherein the mobile user device comprises a at least one of a computer, a portable computer, a local area network (LAN), a network hub, a remote terminal unit for monitoring remote equipment, a digital camera, a fax, a phone, a mobile phone an Ethernet switch, and a router.

7. The system of claim 1, wherein the housing is formed of a material comprising at least one of molded plastic, a metal, a composite material, and weatherproof sealed coated laminate.

8. The system of claim 7, wherein the housing further comprises a second bidirectional high speed data modem disposed in parallel communication with the bidirectional high speed data modem.

9. The system of claim 1, wherein the bidirectional high speed data modem is connected to the cable strand independent of a connection to a utility pole.

10. The system of claim 1, wherein the housing further comprises a detector for detecting a first location of the mobile user device.

11. The system of claim 1, wherein the bidirectional high speed data modem comprises a router.

12. The system of claim 1, further comprising cooling structure configured to provide cooling to the housing.

13. The system of claim 1, further comprising cooling and heating structure configured to provide cooling and heating to the housing.

14. The system of claim 1, wherein the data connection comprises an Ethernet connection, and wherein the digital signal comprises an Ethernet signal.

15. The system of claim 1, wherein the bidirectional high speed data modem, the first radio transceiver, the first processor, and the power supply, are all mounted on a single device.

16. The system of claim 1, further comprising at least one software switch component configured to change the operation of the bidirectional high speed data modem.

17. The system of claim 1, wherein: the first radio transceiver, and the first processor comprises a card.

18. The system of claim 1, wherein the bidirectional high speed data modem is compliant with existing cable standards, including DOCSIS.

19. The system of claim 1, wherein the housing includes plural radio transceivers.

20. The system of claim 1, further comprising a GPS location device in communication with the first processor and configured to detect a location of the housing.

21. The system of claim 1, wherein the housing is weatherproof.

22. The system of claim 21, wherein the housing is sealed.

23. The system of claim 1, further comprising a lightning protection device coupled to the housing.

24. The system of claim 1, wherein the splitter is disposed inside the housing.

25. The system of claim 1, wherein the mounting bracket is configured to couple the housing to an aerial cable strand.

26. A wireless communication device for communicating information from a bidirectional high speed data modem using a first radio transceiver at a first location and a second radio transceiver at a second location, comprising:
   a weather-resistant housing containing (i) the bidirectional high speed data modem operably connected to a first radio transceiver, (ii) a first radio processor, and (iii) a power supply, wherein the housing further comprises mounting structure configured to connect the housing to an outdoor aerial cable strand such that a top of the housing is disposed vertically below a location at which the cable strand supports a shielded two-conductor coaxial cable which carries an RF signal and power; and
   a splitter adapted to engage the coaxial cable and split the RF signal from the power, wherein the power supply outputs DC power to at least one of the bidirectional high speed data modem, the first radio transceiver, and the first radio processor.

27. A device according to claim 26, wherein the bidirectional high speed data modem comprises is a data over cable system interface specifications (DOCSIS)-compliant modem.

28. A device according to claim 26, further comprising cooling structure configured to provide cooling to the housing.

29. A device according to claim 26, further comprising cooling and heating structure configured to provide cooling and heating to the housing.

30. A device according to claim 26, wherein the data connection comprises an Ethernet connection.

31. A device according to claim 26, wherein the bidirectional high speed data modem, the first radio transceiver, the first processor, and the power supply, are all mounted on a single device.

32. A device according to claim 26, further comprising at least one software switch configured to change the operation of the device.

33. A device according to claim 26, wherein the first processor comprises a card.

34. A device according to claim 26, wherein the bidirectional high speed data modem is compliant with existing cable standards, including DOCSIS.

35. A device according to claim 26, wherein the housing includes plural radio transceivers.

36. A device according to claim 26, further comprising a GPS location device in communication with the first processor.

37. A device according to claim 26, wherein the housing is weatherproof.

38. A device according to claim 37, wherein the housing is sealed.

39. A device according to claim 26, further comprising a lightning protection device coupled to the housing.

40. A device according to claim 26, wherein the splitter is disposed inside the housing.

41. A device according to claim 26, wherein the first processor is configured to send a signal from the first radio transceiver to a first antenna, and further comprising a second antenna coupled to a user device, the second antenna receiving the signal from the first antenna and providing it to a second radio transceiver and then to a second processor, both contained in the user device.

42. The system of claim 26, wherein the housing mounting structure is adapted to connect the housing to an outdoor aerial support device.

43. A wireless communication system for communicating information from an interchangeable bidirectional high speed data modem via an Ethernet connection using a first radio transceiver at a first location and a second radio transceiver at a second location, comprising:
   a housing containing (i) the interchangeable bidirectional high speed data modem operably connected to a first radio transceiver, (ii) a first radio processor, and (iii) a power supply, wherein the housing comprises a mounting structure configured to be connected to an outdoor aerial cable strand such that a top of the housing is disposed vertically below a location at which the cable strand supports a shielded two-conductor coaxial cable which carries an RF signal and AC power;
   a splitter engaging the coaxial cable to split the RF signal from the AC power, wherein the power supply converts the AC power to DC power;
   wherein the first radio processor receives a signal from the high speed data modem and sends a corresponding signal to the first radio transceiver, and wherein a corresponding wireless signal is then sent to the first antenna, and wherein the wireless signal is provided from the first antenna to a second antenna coupled to the second radio transceiver at a user device;
   wherein the system communicates the wireless signal from the second antenna to the second radio transceiver and then to a second radio processor contained in the user device; and
   wherein the DC power from the power supply is provided to the interchangeable bidirectional high speed data modem, the first radio transceiver, and the first radio processor.

44. The system according to claim 43, further comprising cooling structure configured to provide cooling to the housing.

45. The system according to claim 43, further comprising cooling and heating structure configured to provide cooling and heating to the housing.

46. The system according to claim 43, wherein the bidirectional high speed data modem, the first radio transceiver, the first processor, and the power supply, are all mounted on a single device.

47. The system according to claim 43, further comprising at least one software switch configured to change the operation of at least one of the bidirectional high speed data modem.

48. The system according to claim 43, wherein the first processor comprises a card.

49. The system according to claim 43, wherein the bidirectional high speed data modem is compliant with DOCSIS.

50. The system according to claim 43, wherein the housing includes plural radio transceivers.

51. The system according to claim 43, further comprising a GPS location device in communication with the first antenna.

52. The system according to claim 43, wherein the housing is weatherproof.

53. The system according to claim 43, wherein the splitter is disposed inside the housing.

54. The system of claim 43, wherein the housing mounting structure is configured to be connected to an aerial outdoor supporting structure.

55. The system of claim 43, wherein the user device comprises at least one of a laptop, a personal digital assistant, a personal electronic device communicating with a satellite, a cell phone, a GPS location device, and a digital camera.

56. The system of claim 43, wherein the user device comprises at least one of a computer, a local area network, a network hub, a remote terminal unit for monitoring remote equipment, a fax, a phone, an Ethernet switch, and a router.

57. The system of claim 43, wherein the system communicates the wireless signal from the second antenna to the second radio transceiver within a mobile user device.

58. The system of claim 43, wherein the system communicates the wireless signal from the second antenna to the second radio transceiver and then to a user device.

59. A wireless communication system for communicating information from a bidirectional high speed data modem via an Ethernet connection using a first radio transceiver at a first location and a plurality of electronic devices, each comprising at least one second radio transceiver, at one or more locations different than said first location, comprising:
- a housing containing (i) the bidirectional high speed data modem operably connected to the first radio transceiver, (ii) a first radio processor, and (iii) a power supply, wherein the housing is coupled to mounting structure which is coupled to an outdoor aerial cable strand such that a top of the housing is disposed vertically below a location at which the cable strand supports a shielded two-conductor coaxial cable which carries an RF signal and power;
- a splitter engaging the coaxial cable to split the RF signal from the power, wherein the power supply receives the split-off power;
- wherein the first radio processor sends a signal to the first radio transceiver, and wherein the first radio transceiver sends a transmit signal to the first antenna and then from the first antenna to a second antenna coupled to one of the second radio transceivers coupled to a user device;
- wherein the system communicates the signal from the second antenna to the one second radio transceiver; and
- wherein the power from the power supply is provided to the interchangeable bidirectional high speed data modem, the first radio transceiver, and the first radio processor.

60. The system according to claim 59, further comprising cooling structure configured to provide cooling to the housing.

61. The system according to claim 59, further comprising cooling and heating structure configured to provide cooling and heating to the housing.

62. The system according to claim 59, wherein the bidirectional high speed data modem, the first radio transceiver, the first processor, and the power supply, are all mounted on a single device.

63. The system according to claim 59, further comprising at least one software switch configured to change the operation of the bidirectional high speed data modem.

64. The system according to claim 59, wherein the first processor comprises a card.

65. The system according to claim 59, wherein the bidirectional high speed data modem is compliant with DOCSIS.

66. The system according to claim 59, wherein the housing includes plural radio transceivers.

67. The system according to claim 59, further comprising a GPS location device in communication with the first processor.

68. The system according to claim 59, wherein the housing is weatherproof.

* * * * *

UNITED STATES PATENT AND TRADEMARK OFFICE
CERTIFICATE OF CORRECTION

| | | |
|---|---|---|
| PATENT NO. | : 8,687,531 B2 | |
| APPLICATION NO. | : 12/964194 | |
| DATED | : April 1, 2014 | |
| INVENTOR(S) | : Smith | |

It is certified that error appears in the above-identified patent and that said Letters Patent is hereby corrected as shown below:

Specification

In Column 4, Line 17, delete "modern/router" and insert -- modem/router --, therefor.

In Column 5, Line 32, delete "(20 I)" and insert -- (201) --, therefor.

Claims

In Column 8, Line 19, in Claim 6, delete "comprises a at least" and insert -- comprises at least --, therefor.

In Column 8, Line 22, in Claim 6, delete "phone" and insert -- phone, --, therefor.

In Column 9, Line 24, in Claim 27, delete "A" and insert -- The --, therefor.

In Column 9, Line 28, in Claim 28, delete "A" and insert -- The --, therefor.

In Column 9, Line 31, in Claim 29, delete "A" and insert -- The --, therefor.

In Column 9, Line 34, in Claim 30, delete "A" and insert -- The --, therefor.

In Column 9, Line 36, in Claim 31, delete "A" and insert -- The --, therefor.

In Column 9, Line 40, in Claim 32, delete "A" and insert -- The --, therefor.

In Column 9, Line 43, in Claim 33, delete "A" and insert -- The --, therefor.

In Column 9, Line 45, in Claim 34, delete "A" and insert -- The --, therefor.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 8,687,531 B2

Claims

In Column 9, Line 48, in Claim 35, delete "A" and insert -- The --, therefor.

In Column 9, Line 50, in Claim 36, delete "A" and insert -- The --, therefor.

In Column 9, Line 53, in Claim 37, delete "A" and insert -- The --, therefor.

In Column 9, Line 55, in Claim 38, delete "A" and insert -- The --, therefor.

In Column 9, Line 57, in Claim 39, delete "A" and insert -- The --, therefor.

In Column 9, Line 59, in Claim 40, delete "A" and insert -- The --, therefor.

In Column 9, Line 61, in Claim 41, delete "A" and insert -- The --, therefor.

In Column 10, Line 1, in Claim 42, delete "system" and insert -- device --, therefor.

In Column 10, Line 49, in Claim 47, delete "of at least one of the" and insert -- of the --, therefor.